United States Patent [19]

Matsuoka et al.

[11] 4,238,425
[45] Dec. 9, 1980

[54] ULTRASONIC HUMIDIFIER

[75] Inventors: Isao Matsuoka; Hiroshi Matsui, both of Nagoya, Japan

[73] Assignee: NGK Spark Plug Co., Ltd., Nagoya, Japan

[21] Appl. No.: 57,475

[22] Filed: Jul. 13, 1979

[30] Foreign Application Priority Data

Sep. 28, 1978 [JP] Japan ................ 53/133391[U]

[51] Int. Cl.³ .................................. B05B 3/14
[52] U.S. Cl. ................... 261/81; 261/72 R; 261/DIG. 4; 261/DIG. 50; 261/DIG. 48; 220/22
[58] Field of Search ............... 261/DIG. 50, DIG. 48, 261/DIG. 4, 72 R, 81; 220/22

[56] References Cited

U.S. PATENT DOCUMENTS

| | | | |
|---|---|---|---|
| 490,091 | 1/1893 | Whipple | 220/22 |
| 1,972,010 | 8/1934 | Malaussene et al. | 261/DIG. 4 |
| 2,454,974 | 11/1948 | Mennesson | 261/DIG. 50 |
| 2,907,648 | 10/1959 | Chapman | 261/DIG. 48 |
| 3,232,587 | 2/1966 | Nastas et al. | 261/DIG. 50 |
| 3,653,531 | 4/1972 | Zurmuehlen | 220/22 |
| 3,953,551 | 4/1976 | Dorall | 261/DIG. 4 |
| 4,031,171 | 6/1977 | Asao et al. | 261/DIG. 48 |

FOREIGN PATENT DOCUMENTS 732064  6/1955  United Kingdom ............... 261/72 R

*Primary Examiner*—Tim R. Miles
*Attorney, Agent, or Firm*—Sughrue, Rothwell, Mion, Zinn and Macpeak

[57] ABSTRACT

An ultrasonic humidifier comprising an atomizing chamber 2 containing water which is atomized by an ultrasonic vibration board 4 to be discharged therefrom. A water supply tank 11 is provided with a valve rod 14 having a valve 15 adapted to close a water outlet 13 thereof. The valve rod 14 protrudes by the elastic force of a spring. A water supply tank chamber 5 which, when said water supply tank is mounted therein with the valve rod 14 directed downward, relatively depresses the lower end of the valve rod with the bottom thereof to open the water outlet 13. A valve rod receiving chamber 6 communicates with the tank chamber. The water level of the atomizing chamber 2 is equal to the level of said water outlet 13 of the water supply tank which confronts with the valve rod receiving chamber 6. A water delivering path (17a or 17b) establishing communication between the valve rod receiving chamber 6 and the atomizing chamber is bent and elongated in a horizontal plane thereof.

8 Claims, 4 Drawing Figures

ULTRASONIC HUMIDIFIER

BACKGROUND OF THE INVENTION

This invention relates to ultrasonic humidifiers. More particularly, it relates to an ultrasonic humidifier which is improved to be free from the drawbacks that when the water level in its atomizing chamber, which is so designed to maintain a constant water level even when the humidifier itself is inclined by the rolling of a structure such as a vehicle or a ship where it is installed, is increased, the quantity of water atomized by the ultrasonic vibration board is decreased, or it becomes impossible for the ultrasonic vibration board to atomize the water.

A conventional ultrasonic humidifier as shown in FIG. 1 comprises: an atomizing chamber 2 provided on one side of the inside of a box-shaped body 1. The atomizing chamber 2 has a discharge outlet 2a provided on top of the box-shaped body 1 and an ultrasonic vibration board 4 secured to the bottom plate 3 of the atomizing chamber 2. A water supply chamber 5 is provided on the opposite side of the inside of the box-shaped body 1; the water supply chamber 5 incorporating a cartridge type water supply tank 11.

A valve rod receiving chamber 6 communicates with the bottom of the water supply chamber 5 at one side, and an internal space is provided below the common bottom of the atomizing chamber 2 and the water supply tank chamber 5 including the valve rod receiving chamber 6. In the internal space, an ultrasonic wave oscillator 7 adapted to apply an ultrasonic wave signal to the vibration board 4 and an air blower 8 are provided.

The flow of air caused by the blower 8 is allowed to flow upwardly along a first air flow path 9 and downwardly along a second air flow path 10 as indicated by the arrows. The water supply tank 11 has a thin neck 12 protruding into the valve rod receiving chamber 6 and a water outlet 13 is formed in the thin neck 12. The outlet 13 is closed by a valve 15 on top of the valve rod 14 with the aid of the elastic force of a spring 16. When the lower end of the valve rod 14 reaches the bottom of the valve rod receiving chamber 6, the valve rod 14 is pushed upwardly as shown in FIG. 1, to open the outlet 13. The valve rod receiving chamber 6 communicates with the atomizing chamber 2 through a horizontally extending water delivering path 17. Therefore, the level of water above the ultrasonic vibration board 4 of the atomizing chamber 2 is determined by the height of the water oulet 13, and the water level in the atomizing chamber 2 is automatically maintained constant even if the water in the atomizing chamber is consumed by atomization.

In a conventional humidifier, the valve rod receiving chamber 6 communicates with the atomizing chamber 2 through a straight water delivery path 17, the distance between the two chambers being short, as shown in FIG. 2. Therefore, the conventional humidifier is disadvantageous in the following points. Consider the case where the humidifier is installed, for instance, on a structure such as a vehicle or a ship. Whenever the structure is inclined, the body 1 is also inclined. When the water level in the atomizing chamber 2 is decreased by the inclination of the body 1, the water in the tank 11 is allowed to flow into the atomizing chamber 2 through the water outlet 13 of the tank 11, which is in the valve rod receiving chamber 6.

Accordingly, even if the body 1 is restored to be horizontal, the water level cannot be restored to the initial level; that is, the new water level caused by the inclination is higher than the predetermined one. As a result, it is difficult to sufficiently transmit the vibration of the board 4 to the water surface. Accordingly, the atomization of the water is insufficient, and at worst it cannot be effectuated.

SUMMARY OF THE INVENTION

Accordingly, an object of this invention is to eliminate the above-described difficulty accompanying a conventional humidifier.

According to the invention, the water delivery path is bent in the horizontal plane, so that even if the atomizing chamber is lowered by inclination, the water is not abruptly fed into the atomizing chamber. This invention will be described in greater detail with respect to the drawings and the detailed description that follows.

BRIEF DESCRIPTION OF THE DRAWINGS

More specifically, FIG. 1 is a vertical sectional view of the conventional ultrasonic humidifier; and FIG. 2 is a sectional view taken along line A—A in FIG. 1.

DESCRIPTION OF THE PREFERRED EMBODIMENTS

Figure 3:
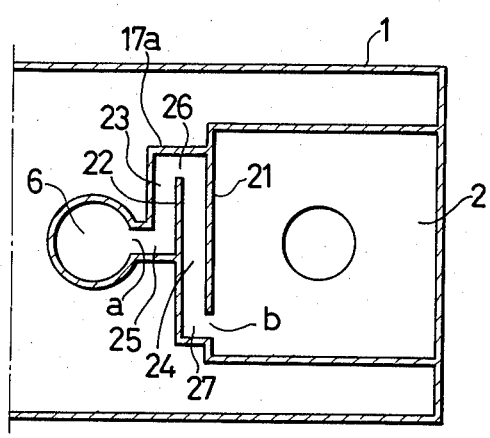
FIGS. 3 and 4 are sectional views taken similarly as in FIG. 2, showing two examples of an ultrasonic humidifier according to this invention.

A first example of an ultrasonic humidifier according to the invention is shown in FIG. 3. The ultrasonic humidifier is provided with a water delivery path 17a extending from the communication outlet a of the valve rod receiving chamber 6 to the communication inlet b of the atomizing chamber 2. More specifically, the water delivery path 17a is bent and accordingly elongated by a side wall 21, confronting the valve rod receiving chamber, of the atomizing chamber 2 and by additionally providing a partition board 22, in such a manner that the delivery path has two 90° bent portions 25 and 27 and one 180° bent portion 26 in its horizontal plane. That is, the water delivery path 17a is elongated in the horizontal plane by forming bent paths 23 and 24 as shown in FIG. 3.

Figure 4:
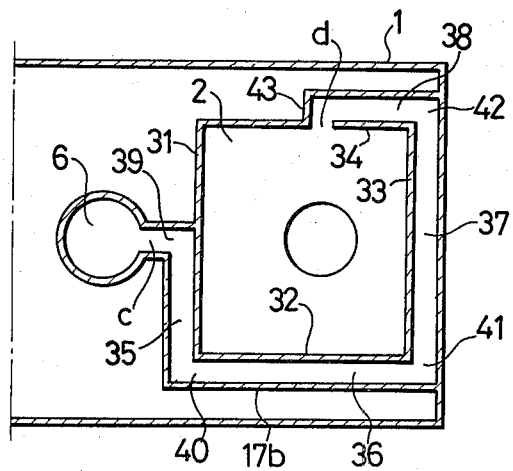

A second example of the ultrasonic humidifier according to the invention is as shown in FIG. 4. The ultrasonic humidifier is provided with a water delivery path 17b extending from the communication outlet c of the valve rod receiving chamber 6 to the communication inlet d of the atomizing chamber 2. More specifically, the water delivering path 17b is elongated by forming bent paths 35, 36, 37 and 38 which extend along one side wall 31, confronting the valve rod receiving chamber 6, of the atomizing chamber 2 and the remaining side walls 32, 33 and 34 of the atomizing chamber 2 in such a manner that they have five 90° bent portions 39, 40, 41 and 42 and 43 in its horizontal plane.

Figure 1:
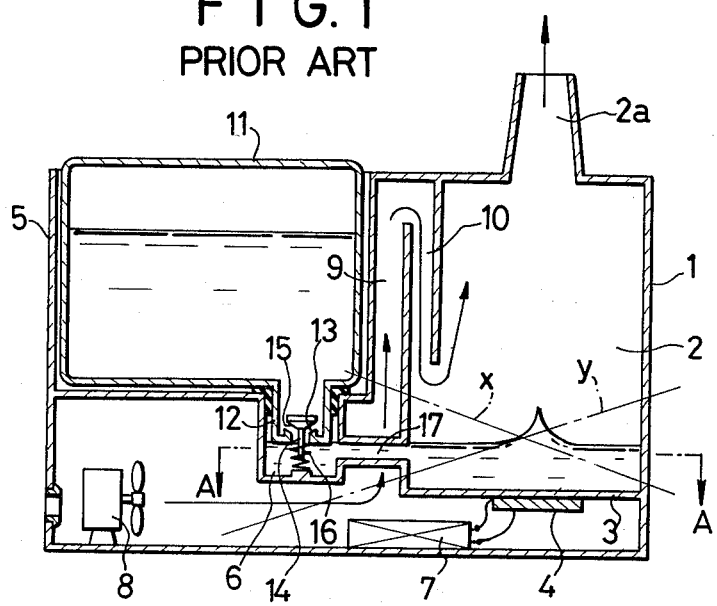
FIGS. 1 and 2 show one example of a conventional ultrasonic humidifier.

In the ultrasonic humidifier shown in FIG. 1, when the water level in the atomizing chamber 2 becomes lower than the level of the water outlet 13 of the water supply tank 11, a small amount of external air is fed through the water delivery path 17 into the valve rod receiving chamber 6. The external air is allowed to rise to the surface of the water in the water supply tank 11 because of the difference in specific gravity between the air and the water. Simultaneously, the water equal in volume to the external air is allowed to flow into the atomizing chamber 2 through the water outlet 13, to thereby restore the water level in the atomizing chamber 2. Thus, the water level is automatically maintained constant in the atomizing chamber 2.

When the body 1 is swung right and left as indicated by the chain lines x and y in FIG. 1, or swung forward and backward, or reciprocated, or swung in the opposite directions as viewed in the figure, the water surface in the atomizing chamber 2 becomes wavy. Accordingly, a part of the water in the short water delivering path 17 and the valve rod receiving chamber 6 is very frequently allowed to flow into the atomizing chamber 2, with the result that a part of the air in the atomizing chamber 2 enters the water supply tank 11 to replace a part of the water in the tank 11. Accordingly, the water level in the atomizing chamber 2 is abnormally increased.

On the other hand, in the ultrasonic humidifier according to the invention, the valve rod receiving chamber 6 is communicated with the atomizing chamber 2 through the water delivering path (17a or 17b) which is bent in the horizontal plane as described with reference to the two examples thereof. Accordingly, even when the body 1 is swung or tilted as described above, a large amount of water is maintained in the long water delivering path 17a or 17b. Furthermore, even if the water surface in the atomizing chamber 2 becomes wavy, a space allowing the air in the atomizing chamber 2 to enter the water outlet 13 of the water supply tank 11 in the valve rod receiving chamber 6 is not formed in the water delivering path 17a or 17b which is bent and elongated in the form of a pipe.

Figure 2:
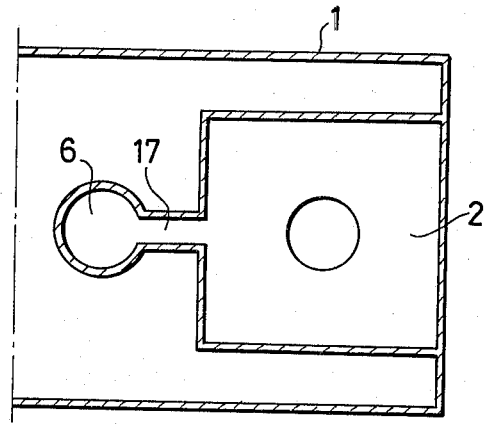

More specifically, in the example shown in FIG. 3, the communication outlet a is connected to the communication inlet b through the long water delivering path 17a having the bent portions 25, 26, and 27. In the example shown in FIG. 4, the communication outlet c is connected to the communication inlet d through the long water delivering path 17b having the bent portions 39, 40, 41, 42 and 43. Therefore, even when the communication inlet b or d is opened for the air by the wavy water surface in the atomizing chamber 2, the communication outlet a or c is filled with the water. Thus, the water delivering path according to the invention can sufficiently prevent the water level increase of the atomizing chamber 2 due to the inclination of the body 1, when compared with the conventional water delivering path 17 shown in FIG. 2.

It is apparent that other modifications of this invention can be made without departing from the essential scope thereof.

What is claimed is:

1. In an ultrasonic humidifier having an atomizing chamber containing water which is atomized by an ultrasonic vibration board, a water supply tank provided with a valve adapted to close a water outlet thereof, said valve having a valve rod, a water supply tank chamber holding said water supply tank mounted therein with the valve rod directed downwrd, and a valve rod receiving chamber communicating with said tank chamber, the water level of said atomizing chamber being maintained equal to the level of said water outlet of said water supply tank confronting with said valve rod receiving chamber, the improvement comprising; a water delivering path establishing communication between said valve rod receiving chamber and said atomizing chamber, said delivery path being bent and elongated in a horizontal plane thereof and being formed with two legs operable to direct the flow of water in substantially opposite directions.

2. The humidifier of claim 1 wherein said legs are separated by a common partition.

3. The humidifier of claim 1 wherein said two legs are separated by said atomizing chamber.

4. The humidifier of claims 1, 2 or 3 further comprising a third leg joining said first two legs and establishing fluid communication therebetween.

5. The humidifier of claim 4 wherein said third leg is at right angles to said first two legs.

6. The humidifier of claim 4 further comprising a fourth leg establishing fluid communication between one of said first two legs and either said valve rod receiving chamber or said atomizing chamber.

7. The humidifier of claim 6 wherein said fourth leg is parallel to said third leg.

8. The humidifier of claim 7 wherein said first two legs are parallel to each other.

* * * * *